B. H. JENKS.

Spindles for Spinning-Machines.

No. 5,521. Reissued August 5, 1873.

Witnesses.
R. T. Campbell
J. N. Campbell

Inventor.
Barton H. Jenks
by his attys
Mason Fenwick & Lawrence

THE NORRIS PETERS CO., PHOTO-LITHO., WASHINGTON, D. C.

UNITED STATES PATENT OFFICE.

BARTON H. JENKS, OF BRIDESBURG, PENNSYLVANIA.

IMPROVEMENT IN SPINDLES FOR SPINNING-MACHINES.

Specification forming part of Letters Patent No. 134,067, dated December 17, 1872; reissue No. 5,521, dated August 5, 1873; application filed July 5, 1873.

*To all whom it may concern:*

Be it known that I, BARTON H. JENKS, of Bridesburg, in the county of Philadelphia and State of Pennsylvania, have invented an Improvement in Interlocking Button Attachments for Spindles and Bobbins of Spinning-Frames; and I do hereby declare that the following is a full, clear, and exact description thereof, reference being had to the accompanying drawings making part of this specification, in which—

Figure 1:
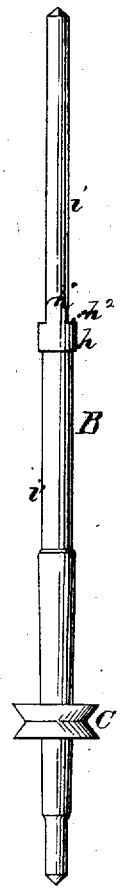
Figure 2:
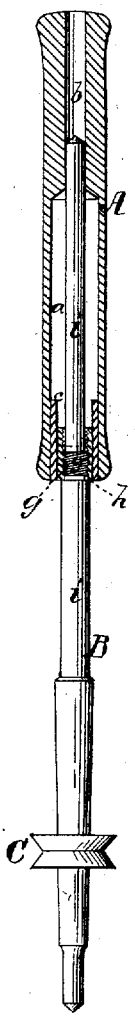
Figure 3:
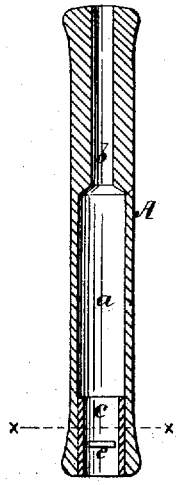
Figure 4:
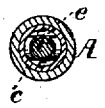

Figure 1 is a view of the spindle with my improved button applied to it. Fig. 2 is a similar view of the spindle, showing the bobbin in section. Fig. 3 is a diametrical section of the bobbin detached from the spindle. Fig. 4 is a section taken transversely through the bobbin in the line *x x*.

Similar letters of reference indicate corresponding parts in the several figures.

The nature of my invention consists in a button made separate from and and so constructed and applied to a spindle of a spinning-frame that it is capable of occupying a position entirely within the lower part of the bobbin, and presents an engaging-surface with which a corresponding surface in the lower end of the bobbin will interlock when the spindle and bobbin are placed in operative relation to each other.

In the accompanying drawings, A represents a bobbin of a well-known construction. To make this bobbin, take a piece of wood and reduce it externally to the required diameter and shape, bore this out so as to form a cylindrical chamber, *a*, two-thirds (more or less) of its length, and then with a smaller cylindrical tool continue the bore through the piece, and thereby form the smaller chamber *b*. In the lower end of the bobbin insert a short hollow cylindrical plug or re-enforce, *c*, in which, as a convenient interlocking means, a metallic engaging-surface in form of cheek-pieces or stop-pins *e e* has been previously inserted by passing the same through the walls of the plug from the outer surface, as represented. The outer ends of the cheek-pieces, if made broader than the inner ends, as is here the case, will, when the plug is inserted into the bobbin and secured therein, be free from liability of pressing further into the plug or of being forced out of the same, the bobbin preventing the latter, and the larger end of the cheek pieces or pins preventing the former from occurring. The cheek pieces or pins *e e* are shown placed diametrically opposite each other, and by this parallel arrangement a space bounded by two reduced sides is formed. B represents a spindle of a spinning-frame. It is made with a reduced stem, *i*, which is received into the smaller bore *b* of the bobbin, and with an enlarged lower portion, *i'*, on which latter is a pulley, C. The spindle is thus formed with a shoulder at the base of the bobbin upon which the button may rest, as shown. *h* is a tubular button with an engaging-surface, *h'*, formed by removing portions of the surface of the tube-button. This tubular button is so applied upon the spindle that it is capable of being placed entirely within the compass of the lower end of the bobbin.

In the drawings a left-hand screw, *g*, formed on the spindle and a matching screw-thread cut in the button are shown as a convenient and suitable mode of fastening the button to the spindle.

From an inspection of Fig. 4 of the drawing it will be seen that when the bobbin is slipped over the spindle one of the cheek-pieces *e* of the bobbin will bear against one of the engaging sides of the button, and the other against the opposite engaging side; and, therefore, when the spindle revolves, the bobbin will revolve with it.

The utility of my invention lies in the facility with which a tubular button with reduced engaging sides may be applied to old spindles, and at the same time occupy a position within the bobbin near the lower end thereof; also, in the facility with which these buttons when worn out may be removed and new ones supplied in their places.

To replace buttons such as herein described will entail but a trifle of expense, whereas if the whole spindle has to be renewed the expense would be very great comparatively.

I am aware that spindles for bobbins have been flattened, and that bobbins which are made with or without plugs in their lower ends have been furnished with cheek-pieces or stop-pins for bearing against the flattened portion of the spindle; therefore I do not herein claim such bobbins and spindles. My invention, however, is applicable to bobbins which are or are not plugged, provided such bobbins are furnished with an engaging-surface corresponding with that of the button on the spindle.

Having described my invention, what I claim as new, and desire to secure by Letters Patent, is—

A tubular button with an engaging-surface, substantially as described, and made separate from and so applied to a spindle of a spinning-frame that it occupies a position and interlocks with a corresponding surface within the lower end of the bobbin, substantially as and for the purpose set forth.

BARTON H. JENKS.

Witnesses:
W. D. BRITTAIN,
STOCKTON BATES.